O. T. ROSS.
STUMP ELIMINATOR.
APPLICATION FILED APR. 9, 1912.
1,066,535.
Patented July 8, 1913.
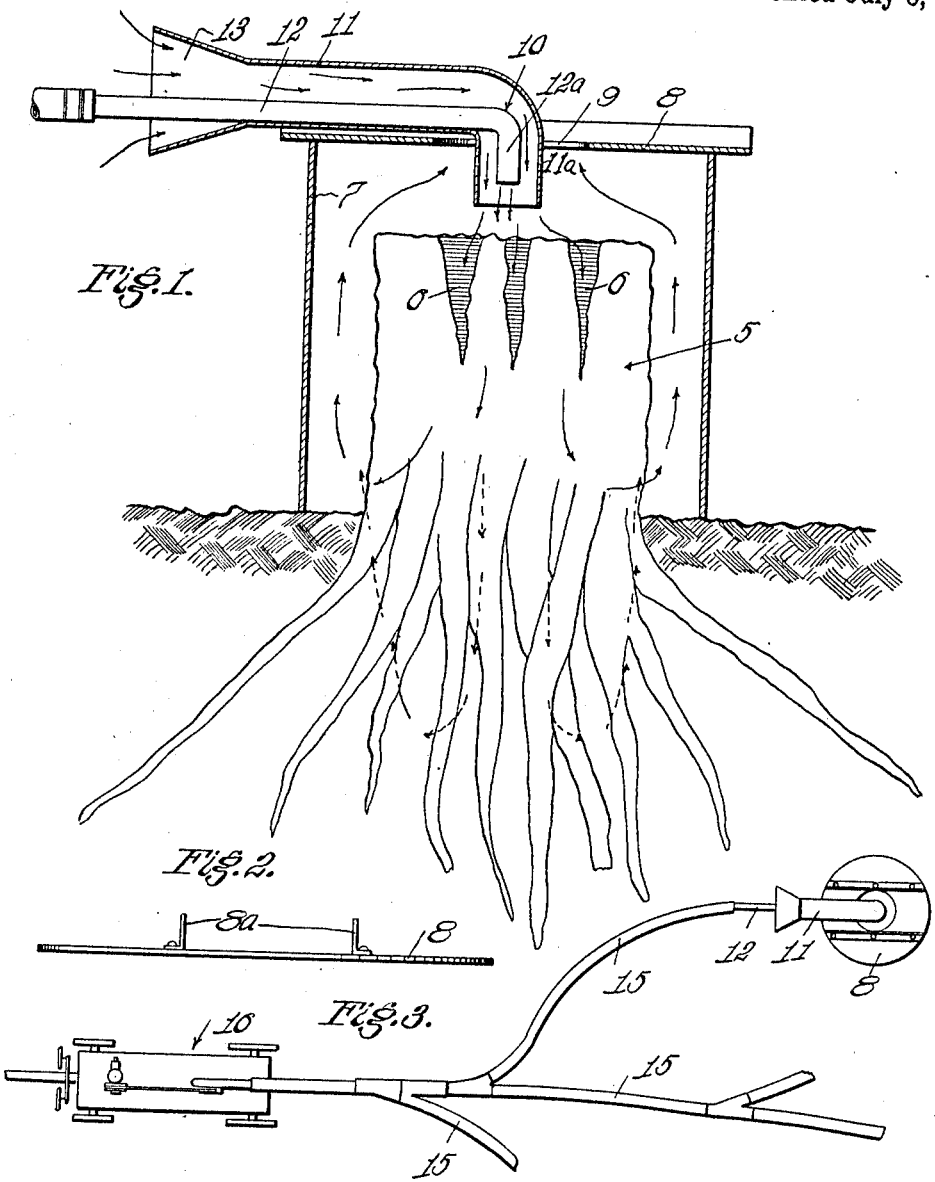
Witnesses:
Elwood H Pinkelew
B. M. Cordie
Inventor,
Oscar T. Ross,
by James T. Pinkelew
his Attorney.

UNITED STATES PATENT OFFICE.

OSCAR T. ROSS, OF LOS ANGELES, CALIFORNIA.

STUMP-ELIMINATOR.

1,066,535.  Specification of Letters Patent.  Patented July 8, 1913.

Application filed April 9, 1912. Serial No. 689,480.

*To all whom it may concern:*

Be it known that I, OSCAR T. ROSS, a citizen of the United States, residing at Los Angeles, in the county of Los Angeles, State of California, have invented new and useful Improvements in Stump-Eliminators, of which the following is a specification.

This invention relates to a device for removing stumps or the like by burning; and it has to do particularly with certain improvements over stump burners now in use, notably improvements in simplicity of construction and efficiency of action.

According to my present invention I employ a simple cylindrical casing without openings except at its end, to encircle the stump; a cover for the casing having a single opening therein, which opening suffices for both inlet of air for combustion and outlet of products of combustion; and an air injection apparatus which will not only supply the required quantity of air for combustion but will form a jet to force the air and the combustion down into the root parts of the stump.

I will describe in the following specification my now preferred form of device, and I have shown this form in the accompanying drawings, in which:

Figure 1 is a sectional view showing the application of my invention. Fig. 2 is a side view of the cover of the casing surrounding the stump. Fig. 3 is a plan view showing my complete plant.

In the drawings 5 designates a stump to which my device is applied, and which may have been preliminarily shattered by a small charge of dynamite or other explosive. This shattering causes fissures 6 which provide for the flame more readily attacking and entering the stump. A preferably cylindrical casing 7 surrounds the stump and is provided with a removable cover 8 having a comparatively large draft aperture 9 preferably centrally located. The diameter and the height of casing 7 will depend upon the size of the stump; and in my complete apparatus I prefer to provide a number of different sizes of the casings.

Cover 8 is provided with reinforcements 8ª so as to prevent sagging when heated; and is generally strengthened to carry the weight of the injector 10. This injector 10 preferably comprises an outer air induction pipe 11 and an inner air pressure pipe 12. Outer atmosphere induction pipe 11 preferably has two portions at right angles to each other, so that the longer outer portion may rest upon cover 8 and the inner shorter portion may project downwardly, as at 11ª, through the draft opening 9 leaving an annular exhaust space around it. The portion 11ª of pipe 11 preferably extends fairly close to the upper end of the stump 5. The outer end of the pipe is provided preferably with a funnel 13 through which atmospheric air may enter. The pressure air pipe 12 is of similar shape, having a portion 12ª which projects down centrally through the portion 11ª of atmosphere pipe 11, the end of portion 12ª being preferably above the end of portion 11ª. Pipe 12 is connected by suitable hose connections to any preferred sort of air pressure apparatus. I have preferably shown this apparatus mounted upon a truck and composed of an internal combustion engine and an air fan; but this may be as desired.

In operation, the parts are placed over a stump in about the relative positions shown in Fig. 1. The stump has previously been shattered as desired, and a fire started by any suitable means. The fire is preferably started near the top, or on top, of the stump. The flow of air through pipe 12 is immediately started, and the jet passing from the end 12ª will immediately draw, by injector action, atmospheric oxygen through pipe 11. The combined volume of air passes downwardly on to and through the stump, constantly supplying the flame with fresh oxygen and driving it downwardly into the stump. As the stump is burned away the fire is driven downwardly until the gases take the paths represented by the dotted arrows, burning away the roots of the stump to a considerable depth below the ground surface. The greatest heat of combustion will always be near the center of the stump, as upon this point the air from pipes 11 and 12 is directly delivered. The gases of combustion pass out as indicated through the draft opening 9 which is made large enough for this purpose.

It will be seen that with this apparatus I am able to supply a comparatively large amount of oxygen to the flame without necessarily utilizing a large amount of power to force air under pressure. A small jet passing through the pipe 12 will suffice to draw in a much larger volume of atmospheric air through the pipe 11; and the combined volume of air is sufficient to keep up an intense flame and a high temperature within the casing and within the stump. The jet projects the air down against the stump even when the stump is burned down a considerable distance; and I have found in actual practice that a fierce flame and complete combustion is maintained until the roots of an average stump are completely consumed some distance below the ground. On account of the greatest heat being contained well within the stump, there is no danger of burning out casing 7. And this holding of the heat and flame within the stump has another advantage, in that the core of the stump and root is completely burned out, the combustion of the outer portions being then easily accomplished.

Having described my invention, I claim:

1. A stump burner or the like, comprising an imperforate cylindrical casing adapted to surround a stump, a cover for said casing having a large central draft aperture, an air induction pipe of smaller diameter than the aperture, said pipe comprising two portions at right angles to each other one portion adapted to rest upon said cover and the other to project downwardly through the said opening in the cover leaving an annular space for exhaust of combustion gases, said air induction pipe having its outer end open to atmosphere, an air blast pipe projecting downwardly through that portion of the induction pipe which projects through said opening, and air compressing apparatus for forcing air under pressure through the air blast pipe, substantially as described.

2. A stump burner or the like, comprising an imperforate open ended cylindrical casing adapted to surround a stump, a cover for said casing having a large central draft aperture, an air induction pipe of smaller diameter than the aperture projecting downwardly through the aperture and leaving an annular space for exhaust of combustion gases, said pipe having its outer end open to atmosphere, an air blast pipe projecting downwardly within and of smaller diameter than the induction pipe, and air compressing apparatus for forcing air under pressure through the air blast pipe.

3. In a device of the character described, a cylindrical casing adapted to surround a stump or the like, a removable cover therefor having a large central draft aperture, an air induction pipe of smaller diameter than the aperture projecting downwardly therethrough leaving an annular space for exhaust of combustion gases, said pipe having an atmosphere receiving funnel on its outer end, a pressure air pipe extending through the induction pipe and discharging centrally downwardly within and above its lower end, an air pressure producing apparatus for forcing air through said pressure pipe.

In witness that I claim the foregoing I have hereunto subscribed my name this 4th day of March, 1912.

OSCAR T. ROSS.

Witnesses:
  JAMES T. BARKELEW,
  ELWOOD H. BARKELEW.

---

Copies of this patent may be obtained for five cents each, by addressing the "Commissioner of Patents, Washington, D. C."